US006383633B1

(12) United States Patent
Allewaert et al.

(10) Patent No.: US 6,383,633 B1
(45) Date of Patent: May 7, 2002

(54) FLUOROCHEMICAL COMPOSITION COMPRISING A POLYMER DERIVED FROM A FLUOROCHEMICAL URETHANE (METH) ACRYLATE MONOMER FOR IMPARTING STAIN RELEASE PROPERTIES TO A SUBSTRATE

(75) Inventors: Kathy E. M. L. A. Allewaert, Haacht; Pierre J. Vander Elst, Elewijt, both of (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/381,872

(22) PCT Filed: May 14, 1998

(86) PCT No.: PCT/US98/09701

§ 371 Date: Sep. 24, 1999

§ 102(e) Date: Sep. 24, 1999

(87) PCT Pub. No.: WO98/51727

PCT Pub. Date: Nov. 19, 1998

(30) Foreign Application Priority Data

May 14, 1997 (EP) .............................................. 97201390

(51) Int. Cl.[7] .......................... B32B 5/02; B32B 27/10; C08F 14/18; C08F 114/18; C08F 214/18
(52) U.S. Cl. ........................ 428/375; 428/393; 428/395; 428/421; 428/480; 428/537.5; 442/88; 442/82; 442/92; 442/94; 526/242; 526/243; 526/247; 526/248; 560/250; 564/153
(58) Field of Search .................... 526/242, 243, 526/247, 248; 428/375, 393, 395, 421, 480, 537.5, 96; 560/250; 564/153; 442/82, 88, 92, 94

(56) References Cited

U.S. PATENT DOCUMENTS

| | | | |
|---|---|---|---|
| 2,803,615 A | 8/1957 | Ahlbrecht et al. | 260/29.6 |
| 2,841,573 A | 7/1958 | Ahlbrecht et al. | 260/79.3 |
| 3,269,961 A | 8/1966 | Bruson et al. | 260/2.5 |
| 3,574,791 A | 4/1971 | Sherman et al. | 260/884 |
| 3,920,614 A | 11/1975 | Kirimoto et al. | 260/63 |
| 4,046,944 A | 9/1977 | Mueller et al. | 428/262 |
| 4,399,077 A | 8/1983 | Vanlerberghe et al. | 260/501.13 |
| 4,508,916 A | 4/1985 | Newell et al. | 556/420 |
| 4,540,765 A | 9/1985 | Koemm et al. | 528/45 |
| 4,563,493 A | 1/1986 | Fukui et al. | 524/233 |
| 4,695,488 A | 9/1987 | Hisamoto et al. | 427/385.5 |
| 4,778,915 A | 10/1988 | Lina et al. | 560/29 |
| 4,788,287 A | 11/1988 | Matsuo et al. | 544/196 |
| 4,792,354 A | 12/1988 | Matsuo et al. | 106/2 |
| 4,841,090 A | 6/1989 | Patel | 558/437 |
| 4,859,754 A | 8/1989 | Maekawa et al. | 526/245 |
| 4,920,190 A | 4/1990 | Lina et al. | 526/288 |
| 5,100,954 A | 3/1992 | Itoh et al. | 524/805 |
| 5,107,033 A | 4/1992 | Pechold | 568/615 |
| 5,276,175 A | 1/1994 | Dams et al. | 560/27 |
| 5,292,796 A | 3/1994 | Dams et al. | 524/598 |
| 5,350,795 A | 9/1994 | Smith et al. | 524/507 |
| 5,370,919 A | * 12/1994 | Fieuws et al. | 428/96 |
| 5,446,118 A | * 8/1995 | Shen et al. | 526/245 |
| 5,453,540 A | 9/1995 | Dams et al. | 564/96 |
| 5,491,261 A | 2/1996 | Haniff et al. | 562/582 |
| 5,509,939 A | 4/1996 | Kirchner | 8/115.51 |
| 5,672,651 A | 9/1997 | Smith | 524/590 |
| 5,841,027 A | 11/1998 | Scarffe | 73/198 |

FOREIGN PATENT DOCUMENTS

| | | |
|---|---|---|
| EP | 526976 | 1/1997 |
| GB | 2 050 396 | 1/1981 |
| JP | 08-225493 | 3/1996 |
| WO | WO 94/10222 | 5/1994 |

OTHER PUBLICATIONS

X–H. Yu et al., "Synthesis and Physical Properties of Poly-(fluoralkylether) urethanes", *Journal of Applied Polymer Science*, vol. 41, 1777–1795 (1990).

* cited by examiner

*Primary Examiner*—Paul Thibodeau
*Assistant Examiner*—Ramsey Zacharia
(74) *Attorney, Agent, or Firm*—Kent S. Kokko

(57) ABSTRACT

A fluorochemical composition is described comprising a polymer derived from a fluorochemical urethane (meth) acrylate monomer. The fluorochemical composition is useful for imparting stain release properties to a substrate.

25 Claims, No Drawings

US 6,383,633 B1

FLUOROCHEMICAL COMPOSITION COMPRISING A POLYMER DERIVED FROM A FLUOROCHEMICAL URETHANE (METH) ACRYLATE MONOMER FOR IMPARTING STAIN RELEASE PROPERTIES TO A SUBSTRATE

FIELD OF THE INVENTION

The present invention relates to fluorochemical compositions for the treatment of substrates, in particular fibrous substrates such as textiles to impart stain release properties to those substrates.

BACKGROUND OF THE INVENTION

Fluorochemical compositions for the treatment of substrates such as leather, textiles and paper, are well known and are used to impart various properties to the substrate such as water and/or oil repellency, waterproofness, anti-staining, and soil-resistance. For example, U.S. Pat. No. 5,100,954 discloses a soil resisting agent containing, as an effective component, a copolymer of (I) a fluorine-containing urethane compound containing a (meth)acryloyl group or an allyl group, and a polyfluoroalkyl group, obtained by reacting (a) a polyfunctional isocyanate having at least trifunctionality, (b) a hydroxy compound containing a (meth)acryloyl group or an allyl group, and (c) a hydroxy compound having a polyfluoroalkyl group, and (II) a copolymerizable compound other than said fluorine-containing urethane compound.

U.S. Pat. No. 4,920,190 describes certain fluorochemical compositions that are based on polymers of fluorinated acrylic monomers in which a perfluoroalkyl group is linked by 2,4-toluenediisocyanate to an acrylate or methacrylate. Amongst useful acrylates and methacrylates are mentioned mono-(meth)acrylates of polyalkyleneglycols. The fluorochemical compositions are said to be suitable as water or oil-repellents for various substrates and in particular leather. U.S. Pat. No. 4,778,915 describes certain polymers of fluorinated acrylic monomers that contain a perfluoroalkyl group linked to an acrylate or methacrylate by a di-isocyanate, for use as water or oil repellents.

Fluorochemical compositions are also used to facilitate stain or soil release from a substrate such as, for example, a fabric. Routine treatments of fabrics with various modifying additives such as softeners, stiffeners, and lubricants, to impart desired properties to a commercial fabric typically increase the oleophilicity of the fabric, thereby significantly increasing its tendency to accept oily stains and reducing its ability to release such stains after laundering. Fluorochemical compositions based on a mixture of a fluorinated compound and a non-fluorinated hydrophilic compound or a chemical "hybrid" compound containing fluorochemical oleophobic segments ("F") and non-fluorinated hydrophilic segments ("H") are known to act as stain release compositions since they provide oil repellency during normal wear and inhibit wicking or diffusion of oily soils into the fabric or fiber bundles as well as facilitate soil release during laundering.

For example, U.S. Pat. No. 4,859,754 describes certain water and oil repellent treatments having desoiling properties that are composed of a polyfluorinated group containing copolymer obtained by copolymerizing a first and second monomer wherein the first monomer contains a polyfluorinated group and the second monomer is an amphiphatic monomer having a hydrophilic moiety and a lipophilic moiety.

U.S. Pat. No. 3,920,614 describes certain high soil release oil- and water repellent copolymers prepared by copolymerization of at least 25% by weight of a fluoroalkyl monomer and 5 to 50% by weight of poly(oxyethylene) acrylate or methacrylate.

U.S. Pat. No. 4,695,488 describes certain polymers obtained by homopolymerization of poly(oxyalkylene) monomers terminated by fluorinated groups. According to the disclosure, a composition based on this polymer could impart stainproofing properties with good durability to a substrate such as plastics, fabric and paper.

Despite the many fluorochemical compositions known to impart stain release properties to a substrate, there continues to be a desire for fluorochemical compositions with improved properties. Desirable properties include easy cleanability of substrates based on natural fibers such as cotton and blends of cotton and polyester, particularly with respect to oil type stains (dirty motor oil, vegetable oil) and water based stains (tea, coffee, wine); low manufacturing cost; high storage stability; easy emulsifiability and high performance even if applied in low quantities. It is also desired that the fluorochemical compositions provide good stain release properties and oil and/or water repellency properties to the substrate.

SUMMARY OF THE INVENTION

The present invention provides a method of treatment of a substrate comprising the step of contacting said substrate with a fluorochemical composition comprising a polymer derived from polymerization of monomer corresponding to the following general formula (I):

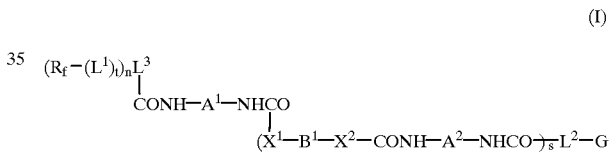

wherein:

$R_f$ is selected from the group consisting of perfluorinated or partially fluorinated aliphatic groups;

$L^1$ and $L^2$ are each independently an organic divalent linking group and they may be the same or different;

$L^3$ represents an organic linking group with a valence of n+1;

t is 0 or 1;

n is an integer of 2 to 20;

$A^1$ and $A^2$ are each independently selected from the group consisting of divalent residues obtained by removing 2 —NCO groups from a corresponding diisocyanate;

$X^1$ is selected from the group consisting of O, NH and S;

$X^2$ is selected from the group consisting of O, NH and S;

$B^1$ represents a hydrophilic residue obtained by removing the groups $HX^1$ and $HX^2$ from a compound $HX^1$—$B^1$—$X^2H$ that comprises a poly(oxyalkylene) group;

G represents a free radical polymerizable group; and s is 0 or 1 with the proviso that when s is 0, $L^2$ represents a hydrophilic segment comprising a poly(oxyalkylene) group or said polymer is derived from a copolymerization of a monomer according to formula (I) and a poly(oxyalkylene) group containing monomer.

Also provided is a fluorochemical composition comprising a polymer derived from a polymerization of a monomer corresponding to the following general formula (I):

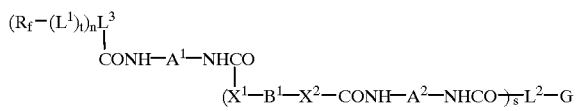

(I)

wherein:
- $R_f$ is selected from the group consisting of perfluorinated or partially fluorinated aliphatic groups;
- $L^1$ and $L^2$ are each independently selected from the group consisting of organic divalent linking groups;
- $L^3$ is an organic linking group with a valence of n+1;
- t is 0 or 1;
- n is an integer of 2 to 20;
- $A^1$ and $A^2$ are each independently selected from the group consisting of divalent residues obtained by removing twp —NCO groups from a corresponding diisocyanate;
- $X^1$ is selected from the group consisting of O, NH and S;
- $X^2$ is selected from the group consisting of O, NH and S;
- $B^1$ represents a hydrophilic segment comprising a poly(oxyalkylene) group;
- G represents a free radical polymerizable group; and
- s is 0 or 1 with the proviso that when s is 0, $L^2$ represents a hydrophilic segment comprising a poly(oxyalkylene) group or said polymer is derived from a copolymerization of a monomer according to formula (I) and a poly(oxyalkylene) group containing monomer.

There is further provided a use of the fluorochemical composition to provide good stain release properties to a substrate and a substrate comprising on at least one of its surfaces, the fluorochemical composition.

Further provided are a monomer according to formula (I) above and a monomer composition including a monomer according to formula (I) and a poly(oxyalkylene)-containing monomer.

DETAILED DESCRIPTION OF THE INVENTION

The polymer used in the fluorochemical composition is derived from at least one monomer according to formula (I) above. If the monomer according to formula (I) includes a poly(oxyalkylene) group, i.e. s is 1, and/or $L^2$ contains a polyoxyalkylene a homopolymer of the monomer of formula (I) can be used as well as a copolymer of that monomer. The polyoxyalkylene group is typically of a sufficient length such that sufficient wetting of the substrates occurs during laundering thereby facilitating removal of stain. Preferably, the number of oxyalkylene moieties in the poly(oxyalkylene) group is between about 18 and 275 or between about 20 and 190 and more preferably between about 23 and 95. In case the monomer according to formula (I) does not include the poly(oxyalkylene) group, the polymer is derived from at least a monomer of formula (I) and at least one comonomer that includes a poly(oxyalkylene) group preferably having between about 5 and 16 oxyalkylene moieties.

The polymer may further include other ethylenically unsaturated comonomers such as vinylacetate, acrylates and methacrylates (e.g., methyl(meth)acrylate, glycidyl methacrylate, ethyl(meth)acrylate), vinylchloride, vinylidenechlorides, styrenes, acrylic acids, methacrylic acids and acrylonitriles. Other suitable comonomers include urethane-acrylate or urethane-methacrylate type monomers that can be obtained by the reaction of a diisocyanate and a hydroxy or amino-functionalised acrylate or methacrylate and another hydroxy or amino-functionalised compound such as an isocyanate blocking agent. Particular examples of the latter type of comonomers include the reaction product of a disocyanate, 2-hydroxyethyl(meth)acrylate and 2-butanone oxime or the reaction product of a diisocyanate, a mono (meth)acrylate of a polyethylene glycol and 2-butanone oxime.

Typically, the polymer includes between about 25% and 100% based on the total number of units in the polymer, preferably between about 40% and 100% of units derived from a monomer according to formula (I) that contains a poly(oxyalkylene) group.

In case the polymer is derived from monomers according to formula (I) that do not include the poly(oxyalkylene) group, the polymer also includes a comonomer that contains poly(oxyalkylene) groups. In this instance, the number of moieties in the polymer derived from monomers according to formula (I) not including poly(oxyalkylene) is preferably between about 5% and 50%, more preferably between about 15% and 40% and the number of units derived from a poly(oxyalkylene) containing comonomer is preferably between about 50% and 95% and more preferably between about 60% and 85%.

Description of Preferred Monomers According to Formula (I).

The fluorinated aliphatic group, $R_f$, is preferably a fluorinated, stable, inert, preferably saturated, non-polar, monovalent alkyl group. It can be straight chain, branched chain, or cyclic or combinations thereof It can contain heteroatoms, bonded only to carbon atoms, such as oxygen, divalent or hexavalent sulfur, or nitrogen. $R_f$ is preferably a fully-fluorinated alkyl group, but hydrogen or chlorine atoms can be present as substituents, but preferably not more than one atom of either is present for every two carbon atoms. The $R_f$ group typically has at least about 3 carbon atoms, preferably about 3 to 14 carbon atoms and more preferably at least about 6 carbon atoms. $R_f$ preferably contains about 40% to 80% fluorine by weight, more preferably about 50% to 78% fluorine by weight. The terminal portion of the $R_f$ radical is preferably a perfluorinated moiety, preferably containing at least about 7 fluorine atoms, e.g., $CF_3CF_2CF_2$—, $(CF_3)_2CF$—, $F_5SCF_2$—. Preferred $R_f$ groups are fully or substantially fluorinated and are preferably those perfluorinated alkyls according to the formula $C_mF_{2m+1}$—where m is 3 to 14. A monomer according to formula (I) includes a plurality of $R_f$ groups as indicated by the variable n. Preferably, the monomer contains 3 to 6 or more $R_f$ groups. Most preferably, the number of $R_f$ groups in the monomer is between about 4 and 9.

Preferably, t in formula (I) represents 1 and an organic divalent linking group $L^1$ is present. Linking groups $L^1$ include straight chain, branched chain or cyclic alkylene, arylene, aralkylene, oxy, oxo, thio, sulfonyl, sulfoxy, amino, imino, sulfonamido, carbonamido, carbonyloxy, urethanylene, ureylene groups, and combinations thereof such as sulfonamidoalkylene or carbonamidoalkylene. A particularly preferred linking group $L^1$ is represented by one of the following formulas:

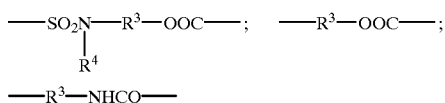

wherein:

R³ is selected from the group consisting of linear or branched alkylenes having 2 to 4 carbon atoms, and R⁴ represents an alkyl having about 1 to 4 carbon atoms, for example methyl, ethyl or n-butyl.

L³ is a linking group with a valence of n+1 that preferably corresponds to the following formula:

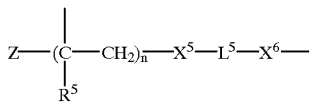

wherein:

n is as defined above,

Z represents the residue of a free radical initiator,

R⁵ is hydrogen or a methyl group,

X⁵ is S,

X⁶ is O or NH and

L⁵ represents an alkylene preferably having 2 to 4 carbon atoms.

B¹ is the hydrophilic residue obtained by removing the groups HX¹ and HX² from a compound HX¹—B¹—X²H that comprises a poly(oxyalkylene) group. Suitable poly(oxyalkylene)groups include those of which the oxyalkylene moiety has 2 to 4 carbons such as —OCH₂—CH₂—, —OCH₂—CH₂—CH₂—, —OCH(CH₃)CH₂—, and —OCH(CH₃)CH(CH₃)—. The oxyalkylene moieties in the poly(oxyalkylene) group can be the same, as in poly(oxypropylene), or can be present as a mixture, as in a heteric straight or branched chain polymer or polymer with randomly distributed oxyethylene and oxypropylene moieties, or as in a straight or branched chain polymer with blocks of oxyethylene units and blocks of oxypropylene units. The poly(oxyalkylene) chain can be interrupted by or include one or more catenary linkages. Where the catenary linkages have three or more valences, they provide a means for obtaining a branched chain of oxyalkylene moieties. The poly(oxyalkylene) group may further contain a mixture of oxyalkylene moieties such as a mixture of oxyethylene and oxypropylene. Preferably, the majority of oxyalkylene moieties are oxyethylene, and preferably the number of oxyethylene moieties is at least about 50% and more preferably at least about 70%. The average number of oxyalkylene moieties is typically between about 18 and 275 and more preferably between about 25 and 182. B¹ may also include an organic divalent linking group that links the poly(oxyalkylene) group to X¹ or X². Such organic divalent linking group is preferably a lower alkylene moiety having between 1 and 4 carbon atoms such as a methylene or ethylene moiety. Preferably, B¹ is the hydrophilic residue obtained by removing the groups HX¹ and HX² from a compound HX¹—B¹—X²H selected from the group consisting of poly(oxyalkylene)diols (such as polyethyleneglycol), poly(oxyalkylene)thiols and poly(oxyalkylene)diamines.

L² is an organic divalent linking group such as oxy, amino, linear or branched alkylenes having 1 to 4 carbon atoms or poly(oxyalkylenes) containing a group such as polyethyleneoxide or polypropyleneoxide. In the case where s is 0, L² preferably comprises a poly(oxyalkylene) group having between about 5 and 20 oxyalkylene groups.

G is a free radical polymerisable group and is typically an ethylenically unsaturated group. Particularly preferred is an α,β-ethylenically unsaturated carbonyl group such as —CO—CH=CH₂ and —CO—C(CH₃)=CH₂. Accordingly, in a preferred embodiment, L²—G together represent a moiety corresponding to the following formula (II):

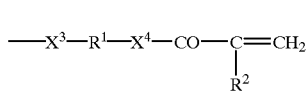

(II)

wherein:

X³ and X⁴ each independently are selected from O or NH,

R¹ is a linear or branched alkylene having 2 to 4 carbon atoms or a poly(oxyalkylene) containing group, and R² is hydrogen or a methyl group.

The monomers according to formula (I) wherein s is 1 are typically prepared according to the following general procedure. In a first reaction, an oligomer containing a plurality of R_f groups and a functionality capable of reacting with an isocyanate is reacted with a diisocyanate. The oligomers can be prepared according to the procedure described in, e.g., U.S. Pat. No. 5,292,796. Typically, their preparation involves a free radical polymerisation of a fluorochemical compound having an ethylenic unsaturation in the presence of an end-capping agent that includes a functional group capable of reacting with an isocyanate. Fluorochemical compounds having an ethylenic unsaturation are disclosed, e.g., in U.S. Pat. No. 2,803,615 (Ahlbrecht et al.) and U.S. Pat. No. 2,841,573 (Ahlbrecht et al.). Examples of such compounds include general classes of fluorochemical olefins such as acrylates, methacrylates, vinyl ethers, and allyl compounds containing fluorinated sulfonamido groups, acrylates or methacrylates derived from fluorochemical telomer alcohols, fluorochemical thiols, and the like. Preferred compounds include N-methyl perfluorooctanesulfonamidoethyl acrylate, N-methylperfluorooctanesulfonamidoethyl methacrylate, N-ethylperfluorooctanesulfonamidoethyl acrylate, N-methylperfluorohexylsulfonamidoethyl acrylate, perfluorooctyl acrylate, N-methyl perfluorooctanesulfonamidoethylvinyl ether, and C₈F₁₇SO₂NHCH₂CH=CH₂, 2-perfluoroalkyl ethyl(meth)acrylate and others such as perfluorocyclohexyl acrylate. In addition to the fluorochemical compound having an ethylenic unsaturation, comonomers such as acrylates and methacrylates can be used.

Suitable end-capping agents typically include a mercapto group and a functional group capable of reacting with an isocyanate. Such functional groups include hydroxy and amino. Examples of end-capping agents include 2-mercaptoethanol, 11-mercaptoundecanol, 3-mercapto-2-butanol, 1-mercapto-2-propanol, 2-mercaptopyridinol, o-, m-, and p-thiocresol and 2-mercaptoethylamine. Preferred functionalized end-capping agents include 2-mercaptoethanol, 4-mercaptobutanol and 2-mercaptoethylamine.

Suitable diisocyanates that can be used include aromatic diisocyanates such as 4,4'- methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate; alicyclic diisocyanates such as 3-isocyanatomethyl-3,5,5-trimethylcyclohexylisocyanate; 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate and cyclic diisocyanates such as isophorone diisocyanate (IPDI). Also, other diisocyanates such as those available from Bayer under the trademark DESMODUR™ can be used, for example DESMODUR™ TT and DESMODUR™ W.

In a second reaction separate from the above reaction, a diisocyanate which may be the same or different as the one used in the above described reaction, is reacted with a monomer that contains a group capable of reacting with an isocyanate such as hydroxy or amino. Preferred monomers are acrylates, methacrylates, acrylamides and methacrylamides. Especially preferred monomers correspond to the following formula:

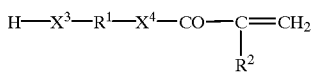

wherein:
X³ and X⁴ are each independently selected from O or NH,
R¹ is a linear or branched alkylene having 1 to 4 carbon atoms or a poly(oxyalkylene) containing group, and
R² is hydrogen or a methyl group.

Specific examples include 2-hydroxyethyl(meth)acrylate, 3-hydroxypropyl(meth)acrylate, 6-hydroxy-hexyl(meth)acrylate, mono (meth)acrylates of a polyethylene glycol, mono (meth)acrylates of a block copolymer of ethylene oxide and propylene oxide; mono (meth)acrylates of amino- or diamino- terminated polyethers and mono (meth)acrylates of tetramethylene oxide glycols.

The reaction products of the above described first and second reaction can then be combined and reacted with a compound of the formula HX¹—B¹—X²H. Suitable compounds of the latter formula are described herein. The reaction conditions that can be employed in each of these three reactions are the conventional reaction conditions employed in reacting an isocyanate. Preferably the reactions are run in the presence of a catalyst. Suitable catalysts include tin salts such as dibutyltin dilaurate, stannous octanoate, stannous oleate, tin dibutyldi-(2-ethyl hexanoate), stannous chloride; and others known to those skilled in the art. The amount of catalyst present will depend on the particular reaction, and thus it is not practical to recite particular preferred concentrations. Generally, however, suitable catalyst concentrations are from about 0.001 percent to 10 percent, preferably about 0.1 percent to 5 percent, by weight based on the total weight of the reactants.

The condensation reactions are preferably carried out under dry conditions in a polar solvent such as ethyl acetate, acetone, methyl isobutyl ketone, toluene and the like. Suitable reaction temperatures will be easily determined by those skilled in the art based on the particular reagents, solvents, and catalysts being used. While it is not practical to enumerate particular temperatures suitable for all situations, generally suitable temperatures are between about room temperature and about 120° C.

Monomers according to formula (I) wherein s is 0 can be prepared in a single step by reacting the fluorochemical oligomer and a monomer that contains a group capable of reacting with an isocyanate such as hydroxy or amino with a diisocyanate. Suitable diisocyanates, monomers containing a group capable of reacting with an isocyanate and the fluorochemical oligomers are described herein.

As described herein, where the monomer according to formula (I) does not include a polyoxyalkylene group, the polymer is derived from a copolymerisation of a monomer according to formula (I) and a comonomer containing a poly(oxyalkylene) group. The comonomer containing a poly (oxyalkylene) group can be a monomer corresponding to formula (I) with s being 1 or L² containing a poly (oxyalkylene) group, but preferably it is a monomer that does not contain a fluorochemical group. Preferred comonomers correspond to the following formula:

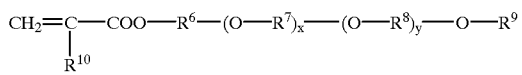

wherein:
R⁶, R⁷ and R⁸ are each independently selected from the group consisting of linear or branched alkylenes having 2 to 4 carbon atoms;
R⁹ is hydrogen or an alkyl group having 1 to 4 carbon atoms;
x and y are each independently an integer of 0 to about 30, typically 0 to about 20 and preferably 0 to about 16, and the sum of x and y is at least about 5;
and R¹⁰ is hydrogen or a methyl group.

Examples of comonomers containing a poly(oxyalkylene) group include mono (meth)acrylates of a polyethylene glycol, mono (meth)acrylates of a block copolymer of ethylene oxide and propylene oxide; mono (meth)acrylates of amino- or diamino-terminated polyethers and (meth) acrylates of methoxypolyethyleneglycols.

The polymer of the fluorochemical composition is typically prepared by free radical polymerisation e.g. by solution- or emulsion polymerization techniques. The polymerisation can be a thermal or photochemical polymerisation. Useful free radical initiators are known in the art and include azo compounds, such as azo(bis)-isobutyronitrile and azo(bis)-2-cyanovaleric acid, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phtalate, diacylperoxides such as benzoyl peroxide and lauryl peroxide.

The fluorochemical composition is soluble in various organic solvents such as ethyl acetate, ethers (di-propylene glycol mono methyl ether, tetrahydrofuran, ethylene glycol ethers), ketones (acetone, methyl ethyl ketone, methyl isobutyl ketone), alcohols (methanol, ethanol, isopropyl alcohol, glycols), dimethylpyrrolidone and mixtures thereof Accordingly, the fluorochemical composition can be used as a solution in an organic solvent or alternatively, an emulsion of the fluorochemical composition in water can be prepared according to well-known techniques. For example, a solution of the fluorochemical composition in an organic solvent, e.g. ethylacetate, gradually can be added to a solution of an emulsifier in water with vigorous stirring. The thus obtained pre-mix may then be subjected to ultrasound treatment or high shear homogenization to obtain a milky to transparent emulsion of the fluorochemical composition in water. If desired, the organic solvent can then be removed e.g. by distillation under reduced pressure.

The fluorochemical composition of this invention can be applied using conventional application methods but is preferably used as an aqueous emulsion. Alternatively, it can be used as a treatment composition in solvent. An aqueous emulsion will generally contain water, an amount of fluorochemical composition effective to provide repellent properties to a substrate treated therewith, and a surfactant in an amount effective to stabilize the emulsion. Water is preferably present in an amount of about 70 to 2000 parts by weight based on 100 parts by weight of the fluorochemical composition of the invention. The surfactant is preferably present in an amount of about 1 to 25 parts by weight, preferably about 2 to 10 parts by weight, based on 100 parts by weight of the fluorochemical composition. Conventional cationic, nonionic, anionic, and zwitterionic surfactants are suitable.

The amount of the treating composition applied to a substrate in accordance with this invention is chosen to impart the desired stain release properties to the substrate surface. Typically, an amount of treating composition sufficient to provide about 0.01% to 5% by weight, preferably about 0.05% to 2% by weight, based on the weight of the substrate, of fluorochemical composition on the treated substrate is sufficient. The amount which is sufficient to impart desired stain release can be determined empirically and can be increased as necessary or desired.

To the fluorochemical composition of the invention there may also be added other fluorinated products, polymers or auxiliary products such as starch, dextrin, casein, polyvinyl alcohols, cellulose and cellulose derivatives such as cellulose ethers, copolymers of (meth)acrylic acid and alkyl esters of (meth)acrylic acid, polyglycols such polyethylene glycols, sizing agents, materials to improve water and/or oil repellency, fire proofing or antistatic properties, buffering agents, fungicidal agents, optical bleaching agents, sequestering agents, mineral salts, surface-active agents, or swelling agents to promote penetration.

Particularly suitable auxiliary products for use in the fluorochemical composition include polyvinyl alcohols, polyethylene glycols, non-ionic cellulose ethers and copolymers of an alkyl (meth)acrylate and (meth)acrylic acid. It was found that in many cases, these auxiliary products improve the stain release performance of the fluorochemical composition. Preferred polyvinyl alcohols are polyvinyl alcohols having a degree of hydrolysis of at least about 65% by weight and more preferably a degree of hydrolysis of at least about 80% by weight.

Examples of non-ionic cellulose ether derivatives include methyl cellulose, hydroxypropyl cellulose and methylhydroxypropyl cellulose. Particularly preferred cellulose ethers are hydroxyalkyl cellulose ethers. Preferably, the etherified cellulose is highly hydrophilic. Accordingly, cellulose ethers that contain large hydrophobic substituents, such as the hydrophobically modified cellulose ether available from Aqualon under the trademark NEXTON™, are not preferred for use in the fluorochemical composition of this invention.

The polyethylene glycols useful as additives are preferably homopolymers of ethylene oxide and typically have a molecular weight between about 200 and 5000.

Preferred copolymers of an alkyl(meth)acrylate and (meth)acrylic acid are copolymers in which the weight ratio of (meth)acrylic acid to the alkyl(meth)acrylate is between about 20:80 and 90:10. More preferably, the weight ratio is between about 50:50 and 85:15. It is further preferred that the alkyl group of the (meth)acrylate monomer is a lower alkyl group having about 1 to 6 carbon atoms. Examples of alkyl (meth)acrylate monomers include, methyl, ethyl and n-butyl acrylates and methacrylates. The copolymer of an alkyl (meth)acrylate and (meth)acrylic acid may further contain moieties derived from ethylenically unsaturated monomers, but preferably, the copolymer only consists of moieties derived from alkyl (meth)acrylates and (meth)acrylic acid. The copolymer may also be partially or fully neutralised with a base such as sodium hydroxide or ammonium hydroxide.

The substrates treated with the fluorochemical composition of this invention are not especially limited and include plastic, metal, glass, fibrous materials such as textile fabrics, wood, non-wovens and paper. The fluorochemical composition is particularly useful for imparting stain release properties to a substrate that comprises natural fibers, in particular a substrate that consists of cellulose fibers or a substrate consisting of cellulose and polyester fibers. Substrates treated with a fluorochemical composition of this invention have particular good stain release properties for dirty motor oil stains and tea stains.

In order to affect treatment of a textile substrate, the substrate can be immersed in a diluted emulsion. The saturated substrate can then be run through a padder/roller to remove excess emulsion, dried and cured in an oven at a temperature and for a time sufficient to provide a cured treated substrate. This curing process is typically carried out at temperatures between about 50° C. to 190° C. depending on the particular system or application method used. In general, a temperature of about 120° C. to 170° C., preferably about 150° C. to 170° C. for a period of about 20 seconds to 10 minutes, preferably 3 to 5 minutes, is suitable. The cured treated substrate can be used as desired, e.g., incorporated or fashioned into a garment.

The invention is further illustrated by reference to the following examples without however the intention to limit the invention thereto.

EXAMPLES

Formulation and Treatment Procedure

Treatment baths were formulated containing a defined amount of the fluorochemical treatment agent. Treatments were applied to the test substrates by padding to provide a concentration of 0.3% or 0.6% solids (based on fabric weight and indicated as SOF (solids on fabric)) and drying the samples at 150° C. during 3 minutes. Test substrates used in the Examples were based on polyester/cotton 67/33 blends (PES/CO), which were commercially available from Arlitex, Avelgem, Belgium.

After drying, the substrates were tested for their stain release and repellency properties.

Respective data of stain release, water and oil repellency shown in the Examples and Comparative Examples were based on the following methods of measurement and evaluation criteria:

Stain Release Test

The stain release test was performed using two types of stains:

Dirty Motor Oil (DMO) obtained from General Motors Garage Houttequiet, Beveren; Belgium;

Tea: obtained by immersing a Lipton™ yellow teabag in 165 ml of water at 65° C. for 3 minutes.

Staining Procedure 1: Drop Method 10 cm×10 cm test samples were stained with 3 drops DMO or tea. The samples were equilibrated at room temperature during 24 hours after which the degree of staining was evaluated by measuring the difference in reflection of a stained versus unstained sample, using a Minolta color meter (Lamp D65). An average of 3 measurements were done for each stain, resulting in a $\Delta L_{IN}$ value.

Staining Procedure 2: Brush Method

For this procedure, 0.35 ml DMO or 0.5 ml tea were placed on 10 cm×10 cm test samples. The stain was brushed into the fabric by brushing 3 times around in a plastic holder of 5 cm diameter placed around the staining liquid. The reflection measurement was done as described above.

Laundering Procedure

The test samples were pinned on a PES/CO ballast of 3 kg and laundered in a Miele washing machine type W 832. A commercial detergent (20 g/kg Clax 100, available from Diversy Lever) was added and the substrates were washed at 70° C., using the main washing program, followed by four rinse cycles and centrifuging. The samples were dried in a tumble dryer and ironed at 150° C. for 15 seconds. Unstained samples were treated the same way. The samples were measured with the Minolta meter and compared to unstained samples, resulting in a $\Delta L_{LD70° C.}$ value.

The less negative value for $\Delta L_{LD70° C.}$ obtained compared to $\Delta L_{IN}$, the better the stain release properties were. %$\Delta\Delta L$, calculated according to formula %$\Delta\Delta L=(\Delta L_{IN}-\Delta L_{LD70° C.}/\Delta L_{IN})\times 100$ gave an indication of the percentage of stain removed during the laundering process. The higher the value, the better the stain removal.

Water Repellency Test (WR)

The water repellency (WR) of a substrate was measured using a series of water-isopropyl alcohol test liquids and was expressed in terms of the "WR" rating of the treated substrate. The WR rating corresponded to the most penetrating test liquid which did not penetrate or wet the substrate surface after 15 seconds exposure. Substrates which were penetrated by or were resistant only to 100% water (0% isopropyl alcohol), the least penetrating test liquid, were given a rating of 0, whereas substrates resistant to a test liquid of 100% isopropyl alcohol (0% water), the most penetrating test liquid, were given a rating of 10. Other intermediate ratings were calculated by dividing the percent isopropyl alcohol in the test liquid by 10, e.g., a treated substrate resistant to a 70%/30% isopropyl alcohol/water blend, but not to an 80%/20% blend, would be given a rating of 7.

Oil Repellency (OR)

The oil repellency of a substrate was measured by the American Association of Textile Chemists and Colorists (AATCC) Standard Test Method No. 118-1983, which test was based on the resistance of a treated substrate to penetration by oils of varying surface tensions. Treated substrates resistant only to Nujol® mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following Table.

| Standard Test Liquids | |
|---|---|
| AATCC Oil Repellency Rating Number | Compositions |
| 1 | Nujol ® |
| 2 | Nujol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Abbreviations

The following abbreviations and trade names were used in the Examples and Comparative Examples:

EtOAc: ethylacetate

RSH: 2-mercapto ethanol

AIBN: azo(bis)isobutyronitrile

MEFOSEA: N-methyl perfluorooctyl sulfonamido ethyl acrylate

TEL AC812: Fluowet AC812, telomer-type fluorochemical acrylate $C_nF_{2n+1}CH_2CH_2OC(O)CH=CH_2$, available from Hoechst AG, Germany $PEG^{200-8000}$: polyethyleneglycol, superscript number being indicative of the molecular weight (Mw), available from Huls, Germany $PEG^{350}$-MA: polyethyleneglycol methacrylate, superscript number being indicative of Mw, available from Inspec, Belgium $MPEG^{750}$-A: acrylate from polyethylene glycol methyl ether, superscript number being indicative of Mw, available from Inspec, Belgium $MPEG^{350-550}$-M: polyethylene glycol methyl ether methacrylate, the superscript number being indicative of Mw, available from Inspec, Belgium $PEG^{468}$-A: Polyethylene glycol acrylate, the superscript number being indicative of Mw, available from Inspec, Belgium IPA: isopropyl alcohol TEA: triethylamine HOEMA: 2-hydroxyethyl methacrylate GMA: glycidyl methacrylate (2,3-epoxypropyl methacrylate)

BO: 2-butanone oxime

IPDI: isophorone diisocyanate

TDI: toluene diisocyanate

DBTDL: dibutyltin dilaurate

MEHQ: methylhydroquinone

Arquad T-50: tallow trimethyl ammonium chloride, available from Akzo, Littleborough, UK PVA: polyvinyl alcohol Mowiol™: polyvinyl alcohol available from Hoechst, with various weight average molecular weights and degree of hydrolysis as indicated in the table:

| Mowiol ™ Type | Degree of Hydrolysis | Molecular Weight |
|---|---|---|
| Mowiol ™ 3-83 | 83 | 14 000 |
| Mowiol ™ 4-98 | 98 | 27 000 |
| Mowiol ™ 5-88 | 88 | 35 000 |
| Mowiol ™ 28-98 | 98 | 145 000 |
| Mowiol ™ 26-88 | 88 | 160 000 |
| Mowiol ™ 40-88 | 88 | 205 000 |

Polyviol™ V03/180: polyvinyl alcohol, with a degree of hydrolysis of 82, viscosity (Höppler) of a 4% solution in water at 20° C. in mPas of 3+/−0.5, available from Wacker-Chemie.

Polyviol™ W25/190: polyvinyl alcohol with a degree of hydrolysis of 81, and viscosity (Höppler) of a 4% solution in water at 20° C. in mPas of 25+/−1.5, available from Wacker-Chemie.

BA: n-butylacrylate

MAA: methacrylic acid

NaOH: sodium hydroxide

MAP 1: (meth)acrylic polymer BA/MAA 18.6/81.4, prepared according to the following procedure:
To a 1 liter 3-necked flask equipped with a reflux condenser, mechanical stirrer and thermometer, were charged 7.0 g of sulfated castor oil solution (70% aqueous solution) and 515.0 g of deionized water. The resulting solution was heated to 95° C., and to this solution were added simultaneously and dropwise over a period of about 2 hours: 198.0 g of metbacrylic acid, 45.2 g of n-butyl acrylate and an aqueous solution consisting of 21.6 g ammonium persulfate dissolved in 50 g of deionized water. The reaction mixture was stirred for 3 hours at 90° C., then was allowed to cool to 50° C. with continued stirring. The resulting copolymer solution was partially neutralized by adding 25.2 g of 20% aqueous NaOH to give a 33% (wt) polycarboxylate polymer aqueous solution with 5.5 equivalents of sodium cation per 100 equivalents of carboxylate anion.

MAP 2: (meth)acrylic polymer BA/MAA 75/25, prepared according to the following procedure:
A polymerization flask was charged with 12.5 g methacrylic acid, 37.5 g butylacrylate and 1 g sulphated castor oil. After addition of 200 g water and 30 g acetone, the reaction mixture was degassed using nitrogen. 0.5 g $(NH_4)_2S_2O_2$ initiator was added. The polymerization was run in a launder-o-meter at 75° C., during 10 hours. The conversion was checked using GLC and the solvent was removed by evaporation. 5% of the methacrylic acid was neutralised with sodium hydroxide.

MAP 3: (meth)acrylic polymer BA/MAA 50/50, prepared according to a similar procedure as described for MAP 2, starting from 20 g methacrylic acid and 20 g butylacrylate.

Culminal™: Culminal™ MHPC 50, a methylhydroxypropyl cellulose available from Aqualon Klucel™: Klucel™ M, a hydroxypropyl cellulose, with 2% Brookfield viscosity of 5000 mPas., available from Aqualon.

All parts, ratios, percentages etc. in the following examples are by weight unless otherwise noted.

A. Synthesis of Fluorochemical Urethane Acrylate Monomers (FM)

The fluorochemical urethane acrylate monomers (FM) listed in Table 2 were prepared according to the general procedure as described below.

1. Synthesis of Fluorochemical Urethane Acrylate Monomers Comprising Polyoxyalkylene Chains The synthesis of fluorochemical urethane acrylate monomers comprising polyoxyalkylene chains was done in 3 steps, and is exemplified by the synthesis of HOEMA/IPDI-PEG$^{3000}$-IPDI/HFO-1 (FM-7 in Table 2). The synthesis of other fluorochemical urethane acrylate monomers comprising polyoxyalkylene chains was carried out similar to the procedure for FM-7.

a. Synthesis of Hydroxyterminated Fluorochemical Oligomers (HFO)

Hydroxy terminated fluorochemical oligomers (HFO) as given in Table 1 were made similar to the synthesis of MEFOSEA/RSH 4/1 (indicated as HFO-1 in Table 1) set forth hereafter.

A round bottom flask equipped with two reflux condensors, a stirrer, a temperature control, a nitrogen inlet and a vacuo outlet was charged with 2.4 moles MEFOSEA and 987 g EtOAc. The mixture was heated at 40° C. until all fluorochemical monomer was dissolved. 0.6 moles 2-mercaptoethanol and 0.15% AIBN were added. The reaction mixture was gradually heated to 80° C. The reaction was run under nitrogen atmosphere at 80° C. for 16 hours, after which more than 95% conversion was obtained.

TABLE 1

Composition of hydroxy terminated fluorochemical oligomers (HFO)

| HFO | Composition | Ratio |
|---|---|---|
| HFO-1 | MEFOSEA/RSH | 4/1 |
| HFO-2 | MEFOSEA/RSH | 8/1 |
| HFO-3 | TEL A812/RSH | 4/1 | b. Synthesis of IPDI/HFO-1

A round bottom flask equipped with a condensor, a stirrer and a temperature control was charged with 100.9 g HFO-1, 8.9 g IPDI and 165 g EtOAc. The reaction mixture was heated at 65° C. until all chemicals were dissolved. 3 drops DBTDL were added and the reaction was run at 70° C. during 6 hours.

c. Synthesis of HOEMA/IPDI (1/1)

A round bottom flask equipped with a condensor, a stirrer and a temperature control was charged with 5.21 g HOEMA, 8.9 g IPDI and 22 g EtOAc. 2 drops DBTDL and 0.01 g MEHQ were added and the reaction was run at 65° C. for 6 hours.

d. Synthesis of HOEMA/IPDI-PEG$^{3000}$-IPD/HFO-1

A round bottom flask equipped with a stirrer, a condenser and a temperature control was charged with 13.72 g IPDI/HFO-1 (obtained under step A.1.b), 1.76 g HOEMA/IDPI (obtained under step A.1.c), 15 g PG$^{3000}$ and 23 g EtOAc. The reaction mixture was heated to 70° C. Four drops DBTDL, 2 drops TEA and 0.01 g MEHQ were added. The reaction was run at 75° C. for 16 hours, after which all isocyanate groups had reacted.

2. Synthesis of Fluorochemical Urethane Acrylate Monomers, Not Comprising Polyoxyalkylene Chains Fluorochemical urethane acrylate monomers not comprising a polyoxyalkylene chain (Table 2), were made using a procedure similar to the synthesis of HOEMA/IPDI/HFO-1 in equimolar ratio (FM-10, Table 2) which is hereafter described.

A round bottom flask equipped with a condensor, a mechanical stirrer and a temperature control was charged with 100.9 g HFO-1, 8.9 g IPDI, 173 g EtOAc, 5.21 g HOEMA and 0.06 g MEHQ. The reaction mixture was heated at 65° C. until all chemicals were dissolved. 4 drops stannous octanoate were added and the reaction was run at 75° C. for 16 hours.

TABLE 2

Composition of Fluorochemical Urethane Acrylate Monomers (FM)

| FM | Composition of Fluorochemical Urethane Acrylate Monomers |
|---|---|
| FM-1 | HOEMA/IPDI-PEG$^{1000}$-IPDI/HFO-1 |
| FM-2 | HOEMA/TDI-PEG$^{1000}$-TDI/HFO-1 |
| FM-3 | HOEMA/IPDI-PEG$^{800}$-IPDI/HFO-1 |
| FM-4 | HOEMA/IPDI-PEG$^{2000}$-IPDI/HFO-1 |
| FM-5 | HOEMA/IPDI-PEG$^{2000}$-IPDI/HFO-2 |
| FM-6 | HOEMA/IPDI-PEG$^{4000}$-IPDI/HFO-2 |
| FM-7 | HOEMA/IPDI-PEG$^{3000}$-IPDI/HFO-1 |
| FM-8 | HOEMA/IPDI-PEG$^{4000}$-IPDI/HFO-1 |
| FM-9 | HOEMA/IPDI-PEG$^{8000}$-IPDI/HFO-1 |
| FM-10 | HOEMA/IPDI/HFO-1 |
| FM-11 | HOEMA/IPDI/HFO-3 |

B. Synthesis of Comonomers

The comonomers which were not commercially available and that were used in the examples were prepared according to the procedure used to synthesize HOEMA/IPDI/BO (molar ratio 1/1/1):

A round bottom flask equipped with a mechanical stirrer, a temperature control, addition funnel, nitrogen inlet and outlet, was charged with 111 g IPDI, 65 g HOEMA, 200 g EtOAc, 0.1 g phenotiazin, 0.1 g MEHQ and 0.2 g dibutyl tin dilaurate. The reaction mixture was slowly heated to about 50° C. A solution of 44 g 2-butanone oxime, dissolved in 20 g EtOAc was slowly added over a period of 1 hour. Then the reaction mixture was stirred at 72° C. for 6 hours. IR analysis indicated that all isocyanate groups had reacted.

This procedure was also used for the synthesis of PEG$^{350}$-MA/IPDI/BO (molar ratio 1/1/1) and HOEMA/IDI/BO (molar ratio 1/1/1).

C. Homo or Copolymerization of Fluorochemical Urethane Acrylate Monomers

The fluorochemical urethane acrylate monomers obtained under step A were homopolymerized or copolymerized with commercially available comonomers or with comonomers prepared as described under the above procedure B in a reaction flask equipped with a mechanical stirrer, a condenser and a temperature control. 0.375% AIBN was added and the reaction was run at 75° C. for 10 to 16 hours. A second charge of 0.18% AIBN was added and the reaction was continued for 6 hours at a temperature of 75° C. The organic solution was added to a water phase containing 3% emulsifier such as Arquad T-50. After homogenisation with an ultrasonic probe (Branson 250 sonifier), the organic solvent was removed by evaporation and an emulsion was obtained.

The composition of the polymers prepared under step C is given in Table 3.

TABLE 3

Composition of Fluorochemical Compounds (FC)

| FC | Fluorochemical Monomer | Comonomer(s) | Ratio by Weight | % Solids |
|---|---|---|---|---|
| FC-1 | FM-1 | — | — | 15 |
| FC-2 | FM-2 | — | — | 15 |
| FC-3 | FM-2 | (HOEMA/TDI/BO) | 90/10 | 15 |
| FC-4 | FM-3 | — | — | 20 |
| FC-5 | FM-4 | — | — | 20 |
| FC-6 | FM-5 | — | — | 20 |
| FC-7 | FM-1 | GMA | 95/5 | 20 |
| FC-8 | FM-1 | (HOEMA/IPDI/BO) | 95/5 | 20 |
| FC-9 | FM-1 | PEG$^{350}$-MA | 90/10 | 20 |
| FC-10 | FM-1 | MPEG$^{430}$-MA | 90/10 | 20 |
| FC-11 | FM-1 | (PEG$^{350}$-MA/IPDI/BO) | 90/10 | 15 |
| FC-12 | FM-6 | — | — | 20 |
| FC-13 | FM-7 | — | — | 10 |
| FC-14 | FM-8 | — | — | 10 |
| FC-15 | FM-9 | — | — | 10 |
| FC-16 | FM-10 | MPEG$^{430}$-MA | 80/20 | 15 |
| FC-17 | FM-10 | PEG$^{350}$-MA | 80/20 | 15 |
| FC-18 | FM-11 | PEG$^{350}$-MA | 80/20 | 15 |
| FC-19 | FM-11 | MPEG$^{430}$-MA | 80/20 | 15 |
| FC-20 | FM-11 | PEG$^{350}$-MA/GMA | 75/20/5 | 15 |
| FC-21 | FM-11 | PEG$^{350}$-MA/(HOEMA/IPDI/BO) | 75/20/5 | 15 |
| FC-22 | FM-10 | PEG$^{350}$-MA | 90/10 | 15 |
| FC-23 | FM-10 | PEG$^{350}$-MA | 80/20 | 15 |
| FC-24 | FM-10 | PEG$^{350}$-MA | 70/30 | 15 |
| FC-25 | FM-10 | PEG$^{350}$-MA/GMA | 75/20/5 | 15 |
| FC-26 | FM-10 | PEG$^{350}$-MA/(HOEMA/IPDI/BO) | 75/20/5 | 15 |
| FC-27 | FM-10 | MPEG$^{430}$-MA | 80/20 | 15 |
| FC-28 | FM-11 | MPEG$^{430}$-MA | 50/50 | 15 |
| FC-29 | FM-11 | MPEG$^{550}$-MA | 50/50 | 15 |
| FC-30 | FM-11 | MPEG$^{750}$-A | 50/50 | 15 |
| FC-31 | FM-11 | PEG$^{468}$-A/GMA | 50/45/5 | 15 |
| FC-32 | FM-10 | MPEG$^{430}$-MA | 50/50 | 15 |
| FC-33 | FM-10 | MPEG$^{550}$-MA | 50/50 | 15 |
| FC-34 | FM-10 | MPEG$^{750}$-A | 50/50 | 15 |
| FC-35 | FM-11 | MPEG$^{750}$-A | 30/70 | 20 |
| FC-36 | FM-11 | MPEG$^{550}$-MA | 30/70 | 10 |
| FC-37 | FM-11 | MPEG$^{430}$-MA | 30/70 | 10 |

Examples 1 to 25 and Comparative Example C-1

In Examples 1 to 25, fluorochemical compounds were prepared and emulsified according to the general procedure described above. Polyester/cotton blends were treated with the fluorochemical compounds so as to give 0.3 or 0.6% SOF. After treatment, the fabrics were dried at 150° C. for 3 minutes. The treated PES/CO substrates were stained with dirty motor oil using the drop method. Comparative Example C-1 was made with untreated PES/CO. The results of stain release and oil and water repellency are given in Table 4.

TABLE 4

DMO (Drop Method) Stain Release and Repellent Properties

| Ex No | Fluorochemical Compound | % SOF | Initial Performance OR | Initial Performance WR | Stain Release Color Measurement $\Delta L_{IN}$ | Stain Release Color Measurement $\Delta L_{LD70° C.}$ | % $\Delta\Delta L$ |
|---|---|---|---|---|---|---|---|
| 1 | FC-1 | 0.3 | 5 | 9 | −5.57 | −0.63 | 89 |
| 2 | FC-1 | 0.6 | 5 | 9 | −7.21 | −0.49 | 93 |
| 3 | FC-2 | 0.3 | 5 | 7 | −4.4 | −1.12 | 75 |
| 4 | FC-2 | 0.6 | 5 | 8 | −5.26 | −0.84 | 84 |
| 5 | FC-3 | 0.3 | 6 | 5 | −10.08 | −5.07 | 50 |
| 6 | FC-3 | 0.6 | 6 | 6 | −3.19 | −1.26 | 61 |
| 7 | FC-16 | 0.3 | 3 | 4 | −6.56 | −2.45 | 63 |

TABLE 4-continued

DMO (Drop Method) Stain Release and Repellent Properties

| Ex No | Fluorochemical Compound | % | Initial Performance SOF | OR | WR | Stain Release Color Measurement $\Delta L_{IN}$ | $\Delta L_{LD70°C}$ | % $\Delta\Delta L$ |
|---|---|---|---|---|---|---|---|---|
| 8 | FC-17 | 0.3 | 4 | 5 | | −9.84 | −3.02 | 69 |
| 9 | FC-17 | 0.6 | 5 | 7 | | −8.77 | −0.24 | 97 |
| 10 | FC-18 | 0.3 | 6 | 5 | | −11.46 | −3.5 | 69 |
| 11 | FC-18 | 0.6 | 6 | 8 | | −8.9 | −1.2 | 87 |
| 12 | FC-19 | 0.3 | 6 | 4 | | −10.9 | −4.09 | 62 |
| 13 | FC-19 | 0.6 | 6 | 7 | | −10.83 | −2.91 | 73 |
| 14 | FC-20 | 0.3 | 6 | 4 | | −10.5 | −5.16 | 51 |
| 15 | FC-20 | 0.6 | 6 | 4 | | −8.17 | −3.3 | 60 |
| 16 | FC-21 | 0.6 | 6 | 4 | | −11 | −5.08 | 54 |
| 17 | FC-22 | 0.3 | 6 | 9 | | −12.94 | −6.38 | 51 |
| 18 | FC-22 | 0.6 | 6 | 8 | | −7.05 | −2.53 | 64 |
| 19 | FC-23 | 0.6 | 6 | 9 | | −7.36 | −1.55 | 79 |
| 20 | FC-24 | 0.3 | 6 | 9 | | −9.48 | −2.48 | 74 |
| 21 | FC-24 | 0.6 | 6 | 9 | | −10.93 | −3.91 | 64 |
| 22 | FC-25 | 0.6 | 6 | 7 | | −9.47 | −4.62 | 51 |
| 23 | FC-26 | 0.3 | 6 | 8 | | −7.89 | −3.68 | 53 |
| 24 | FC-27 | 0.3 | 6 | 8 | | −6.99 | −1.62 | 77 |
| 25 | FC-27 | 0.6 | 6 | 9 | | −8.96 | −2.94 | 67 |
| C-1 | — | — | 0 | 0 | | −15.45 | −9.56 | 38 |

The data shows that good to very good DMO stain release properties were obtained using the fluorochemical compositions of the invention. The optimal amount of fluorochemical compound needed to treat the substrate depends on the particular fluorochemical composition used. It can further be seen that not only was good stain release obtained, but all treated PES/CO substrates show remarkable high oil and especially high water repellencies, indicating that the compositions are suitable for use as fluorochemical repellent agents. This is a further advantage over the untreated samples which show no oil or water repellency at all.

Examples 26 to 54 and Comparative Example C-2

In Examples 26 to 54 the same type of experiment was repeated but this time the DMO was applied to the fabric by the brush method. Comparative Example C-2 was made with untreated PES/CO substrate. The results of stain release and oil and water repellency are given in Table 5.

TABLE 5

DMO Stain Release (Brush) and Oil and Water Repellency

| Ex No | Fluorochemical Compound | % | Initial Performance SOF | OR | WR | Stain Release Color Measurement $\Delta L_{IN}$ | $\Delta L_{LD70°C}$ | % $\Delta\Delta L$ |
|---|---|---|---|---|---|---|---|---|
| 26 | FC-1 | 0.6 | 6 | 10 | | −17.79 | −4.31 | 76 |
| 27 | FC-4 | 0.6 | 6 | 10 | | −17.99 | −6.47 | 64 |
| 28 | FC-5 | 0.6 | 5 | 9 | | −18 | −3.54 | 80 |
| 29 | FC-6 | 0.6 | 4 | 5 | | −17.87 | −7.58 | 58 |
| 30 | FC-7 | 0.6 | 6 | 10 | | −17.71 | −5.95 | 66 |
| 31 | FC-8 | 0.6 | 6 | 10 | | −18.1 | −7.08 | 61 |
| 32 | FC-9 | 0.6 | 6 | 10 | | −18.22 | −7.38 | 59 |
| 33 | FC-10 | 0.6 | 6 | 10 | | −18.14 | −5.37 | 70 |
| 34 | FC-11 | 0.6 | 6 | 6 | | −17.98 | −3.49 | 81 |
| 35 | FC-12 | 0.6 | 4 | 3 | | −18.44 | −8.08 | 56 |
| 36 | FC-13 | 0.3 | 6 | 10 | | −18.15 | −3.95 | 78 |
| 37 | FC-14 | 0.6 | 5 | 3 | | −18.95 | −7.76 | 59 |
| 38 | FC-15 | 0.3 | 1 | 0 | | −16.83 | −7.91 | 53 |
| 39 | FC-17 | 0.6 | 6 | 9 | | −17.9 | −8.33 | 53 |
| 40 | FC-18 | 0.6 | 7 | 3 | | −17.32 | −8.61 | 50 |
| 41 | FC-19 | 0.6 | 6 | 5 | | −17.79 | −6.48 | 64 |
| 42 | FC-20 | 0.6 | 6 | 6 | | −17.59 | −9.08 | 48 |
| 43 | FC-25 | 0.6 | 6 | 9 | | −17.81 | −11.82 | 34 |
| 44 | FC-27 | 0.6 | 6 | 6 | | −17.8 | −11.48 | 36 |
| 45 | FC-28 | 0.6 | 6 | 4 | | −17.43 | −5.97 | 66 |
| 46 | FC-29 | 0.6 | 6 | 3 | | −18.06 | −7.54 | 58 |
| 47 | FC-30 | 0.6 | 5 | 4 | | −18.81 | −8.4 | 55 |
| 48 | FC-31 | 0.6 | 6 | 9 | | −18.18 | −11.17 | 39 |
| 49 | FC-32 | 0.6 | 6 | 6 | | −17.7 | −10.09 | 43 |
| 50 | FC-33 | 0.6 | 5 | 5 | | −18.34 | −9.87 | 46 |
| 51 | FC-34 | 0.6 | 4 | 5 | | −17.43 | −9.05 | 48 |
| 52 | FC-35 | 0.6 | 5 | 2 | | −18.33 | −7.21 | 61 |
| 53 | FC-36 | 0.6 | 6 | 1 | | −18.74 | −10.1 | 46 |
| 54 | FC-37 | 0.6 | 5 | 3 | | −18.88 | −6.05 | 68 |
| C-2 | — | — | 0 | 0 | | −15.32 | −10.18 | 34 |

In this more demanding test, most of the treated substrates performed better than the untreated sample as shown by the less negative values of $\Delta L_{LD70°C}$ for most treated samples. In addition to good DMO stain release, the treated samples showed high oil and water repellency.

Examples 55 to 70 and Comparative Example C-3

In Examples 55 to 70, PES/CO blends treated with the fluorochemical compounds according to the invention were stained with tea using the drop method. Comparative Example C-3 was made with untreated fabric. The results of stain release and oil and water repellency are given in Table 6.

TABLE 6

Stain Release (Tea-Drop) and Repellency Properties of PES/CO

| Ex No | Fluorochemical Compound | % | Initial Performance SOF | OR | WR | Stain Release Color Measurement $\Delta L_{IN}$ | $\Delta L_{LD70°C}$ | % $\Delta\Delta L$ |
|---|---|---|---|---|---|---|---|---|
| 55 | FC-1 | 0.3 | 5 | 9 | | −6.14 | −0.76 | 88 |
| 56 | FC-2 | 0.3 | 5 | 7 | | −6.13 | −0.75 | 88 |
| 57 | FC-3 | 0.3 | 6 | 5 | | −6.34 | −1.14 | 82 |
| 58 | FC-16 | 0.6 | 5 | 3 | | −6.27 | −0.65 | 90 |
| 59 | FC-17 | 0.3 | 4 | 5 | | −6.91 | −0.77 | 89 |
| 60 | FC-17 | 0.6 | 5 | 7 | | −5.67 | −0.4 | 93 |
| 61 | FC-18 | 0.6 | 6 | 8 | | −8.41 | −1.91 | 77 |
| 62 | FC-19 | 0.6 | 6 | 7 | | −6.97 | −2.91 | 58 |
| 63 | FC-20 | 0.6 | 6 | 4 | | −6.23 | −1.94 | 69 |
| 64 | FC-21 | 0.6 | 6 | 4 | | −4.98 | −2.09 | 58 |
| 65 | FC-22 | 0.3 | 6 | 9 | | −7.84 | −1.04 | 87 |
| 66 | FC-23 | 0.3 | 6 | 9 | | −7.68 | −1.09 | 86 |
| 67 | FC-24 | 0.3 | 6 | 9 | | −9.69 | −1.37 | 86 |
| 68 | FC-25 | 0.3 | 6 | 8 | | −7.65 | −0.75 | 90 |
| 69 | FC-26 | 0.3 | 6 | 8 | | −7.46 | −1.36 | 82 |
| 70 | FC-27 | 0.3 | 6 | 8 | | −7.74 | −1.48 | 81 |
| C-3 | — | — | 0 | 0 | | −2.32 | −0.91 | 61 |

The results show that the fluorochemical compositions can also improve the tea stain release properties of a PES/CO substrate. High tea stain removal was observed, in several cases about 90% of the tea stain could be removed.

Examples 71 to 103 and Comparative Example C-4

In Examples 71 to 103, treated PES/CO substrates were tested with tea stains, but now using the brush method.

Comparative Example C-4 was made with untrated PES/CO substrate. The results of stain release and oil and water repellency are given in Table 7.

TABLE 7

Tea Stain Release Using Brush Method

| Ex No | Fluorochemical Compound | % SOF | Initial Performance OR | WR | Stain Release Color Measurement $\Delta L_{IN}$ | $\Delta L_{LD70°C.}$ | % $\Delta\Delta L$ |
|---|---|---|---|---|---|---|---|
| 71 | FC-1 | 0.3 | 6 | 10 | −1.45 | −0.75 | 48 |
| 72 | FC-1 | 0.6 | 6 | 10 | −1.47 | −0.41 | 72 |
| 73 | FC-4 | 0.3 | 5 | 9 | −1.74 | −0.88 | 49 |
| 74 | FC-4 | 0.6 | 6 | 10 | −1.65 | −0.81 | 51 |
| 75 | FC-5 | 0.6 | 5 | 9 | −1.89 | −0.79 | 58 |
| 76 | FC-6 | 0.3 | 3 | 3 | −2.09 | −0.76 | 64 |
| 77 | FC-6 | 0.6 | 4 | 5 | −1.69 | −0.46 | 73 |
| 78 | FC-7 | 0.6 | 6 | 10 | −1.83 | −0.77 | 58 |
| 79 | FC-8 | 0.6 | 6 | 10 | −1.99 | −0.84 | 58 |
| 80 | FC-9 | 0.6 | 6 | 10 | −1.75 | −0.67 | 62 |
| 81 | FC-10 | 0.6 | 6 | 10 | −1.91 | −0.66 | 65 |
| 82 | FC-11 | 0.6 | 6 | 6 | −1.93 | −0.7 | 64 |
| 83 | FC-12 | 0.6 | 4 | 3 | −2.09 | −1.03 | 51 |
| 84 | FC-13 | 0.6 | 6 | 10 | −2.86 | −0.98 | 66 |
| 85 | FC-14 | 0.6 | 5 | 3 | −2.77 | −0.84 | 70 |
| 86 | FC-15 | 0.6 | 2 | 0 | −3.11 | −0.54 | 83 |
| 87 | FC-17 | 0.6 | 6 | 9 | −1.46 | −0.68 | 53 |
| 88 | FC-18 | 0.6 | 6 | 8 | −8.41 | −1.91 | 77 |
| 89 | FC-19 | 0.6 | 6 | 5 | −2.55 | −0.93 | 64 |
| 90 | FC-20 | 0.6 | 6 | 6 | −1.52 | −1.01 | 34 |
| 91 | FC-25 | 0.6 | 6 | 9 | −1.5 | −1.05 | 30 |
| 92 | FC-27 | 0.3 | 6 | 6 | −1.43 | −0.91 | 36 |
| 93 | FC-28 | 0.6 | 6 | 4 | −2.02 | −0.79 | 61 |
| 94 | FC-29 | 0.6 | 6 | 3 | −2.33 | −1.19 | 49 |
| 95 | FC-30 | 0.6 | 5 | 4 | −2.19 | −1.22 | 44 |
| 96 | FC-31 | 0.3 | 6 | 9 | −1.69 | −1.37 | 19 |
| 97 | FC-32 | 0.3 | 6 | 6 | −1.43 | −0.91 | 36 |
| 98 | FC-33 | 0.3 | 4 | 5 | −1.63 | −1.34 | 18 |
| 99 | FC-34 | 0.6 | 4 | 5 | −1.97 | −0.9 | 54 |
| 100 | FC-35 | 0.6 | 5 | 2 | −2.68 | −0.85 | 68 |
| 101 | FC-36 | 0.3 | 4 | 0 | −3.15 | −1.2 | 62 |
| 102 | FC-37 | 0.3 | 2 | 2 | −3.28 | −0.99 | 70 |
| 103 | FC-37 | 0.6 | 5 | 3 | −2.04 | −0.61 | 70 |
| C-4 | — | — | 0 | 0 | −2.62 | −1.22 | 53 |

Most of the treated substrates perform better or at least as good as untreated material for tea stain release. Moreover, they show high water and oil repellency. Depending on the method used to stain the substrates, other results were obtained. While some formulations have lower stain release properties as untreated samples in this test, they showed good or excellent performance in the drop method. For example, fluorochemicals FC-20, 25 and 27 (used in Examples 90–92), showed low tea stain release using the brush method, but very high tea stain release using the drop method (Examples 63, 68 and 70).

Examples 104 to 111 and Comparative Example C-5

In Examples 104 to 111, PES/CO substrate was treated with fluorochemical compound FC-37 (Example 104) or with a 50/50 blend of FC-37 with various polyvinyl alcohols as reported in Table 8 (Examples 105 to 111). The substrate was treated in such a way as to have 0.6% SOF fluorochemical compound and 0.6% SOF polyvinyl alcohol (except Example 104). Comparative Example C-5 was made using untreated PES/CO. The treated and untreated substrates were stained with DMO (brush) and tested for their stain release and repellency properties. The results are given in Table 8.

TABLE 8

Stain Release for DMO Stains

| Ex No | PVA | Initial Performance OR | WR | Stain Release Colour Measurement* $\Delta L_{IN}$ | $\Delta L_{LD70°C.}$ | % $\Delta\Delta L$ |
|---|---|---|---|---|---|---|
| 104 | — | 4 | 1 | −58.8 | −14.6 | 75 |
| 105 | Mowiol ™ 3-83 | 5 | 0 | −56.1 | −14.3 | 75 |
| 106 | Mowiol ™ 4-98 | 6 | 1 | −57.8 | −9.1 | 84 |
| 107 | Mowiol ™ 5-88 | 4 | 1 | −55.5 | −13.0 | 77 |
| 108 | Mowiol ™ 28-99 | 6 | 1 | −56.4 | −5.9 | 89 |
| 109 | Mowiol ™ 26-88 | 6 | 0 | −56.0 | −11.0 | 80 |
| 110 | Polyviol ™ V03/180 | 3 | 0 | −55.3 | −13.2 | 76 |
| 111 | Polyviol ™ W25/190 | 4 | 1 | −51.5 | −9.9 | 81 |
| C-5 | — | 0 | 0 | −45.0 | −21.9 | 51 |

Note:
*lens opening of the Minolta colorimeter was set at 53 mm

From the results it can be concluded that the good stain release properties provided by the fluorochemical compound alone could further be improved by the addition of a polyvinyl alcohol. In some cases, an improvement in oil repellency was noticed as well.

Examples 112 to 119

In Examples 112 to 119, PES/CO substrate was treated with fluorochemical ds FC-17 and FC-35 or with a 50/50 blend of the fluorochemical compound and polyvinyl alcohol Mowiol™ 3-83. The substrate was treated in such a way as to have 0.6% fluorochemical compound and 0.6% SOF polyvinyl alcohol. The treated substrates were stained with Tea or DMO (brush) and tested for their stain release and oil and water repellency properties. The results are reported in Table 9.

TABLE 9

Stain Release for Tea and DMO Stains

| Ex No | FC compound | PVA | Initial Performance OR | WR | Stain Release Colour Measurement $\Delta L_{IN}$ | $\Delta L_{LD70°C.}$ | % $\Delta\Delta L$ |
|---|---|---|---|---|---|---|---|
| Stain: TEA | | | | | | | |
| 112 | FC-17 | — | 6 | 6 | −2.5 | −1.1 | 55 |
| 113 | FC-17 | Mowiol ™ 3-83 | 5 | 2 | −2.7 | −0.9 | 67 |
| 114 | FC-35 | — | 5 | 2 | −2.9 | −1.3 | 56 |
| 115 | FC-35 | Mowiol ™ 3-83 | 5 | 0 | −2.6 | −0.8 | 70 |
| Stain: DMO | | | | | | | |
| 116 | FC-17 | — | 6 | 6 | −16.8 | −8.7 | 48 |
| 117 | FC-17 | Mowiol ™ 3-83 | 5 | 2 | −16.4 | −7.1 | 57 |
| 118 | FC-35 | — | 5 | 2 | −17.0 | −6.1 | 64 |
| 119 | FC-35 | Mowiol ™ 3-83 | 5 | 0 | −17.8 | −4.9 | 72 |

The results show that improved stain release performance can be obtained by blending polyvinyl alcohol with the fluorochemical compound. Little or no influence on oil repellency, but some decrease in water repellency was observed.

Examples 120 to 129 and Comparative Examples C-6 and C-7

In Examples 120 to 129, PES/CO substrate was treated with fluorochemical compound FC-37 or with a 50/50 blend of FC-37 with polyvinyl alcohol, as shown in Table 10. The substrate was treated in such a way as to have 0.6% SOF fluorochemical compound or 0.6% SOF fluorochemical compound and 0.6% SOF polyvinyl alcohol. Comparative Examples C-6 and C-7 were made using untreated PES/CO. The treated and untreated substrates were stained with tea or wine and tested for their stain release and repellency properties. The results are reported in Table 10.

TABLE 10

| Ex No | Polyvinyl alcohol | Initial Performance | | Stain Release Performance* | | |
|---|---|---|---|---|---|---|
| | | OR | WR | $\Delta L_{IN}$ | $\Delta L_{LD70°\,C.}$ | % $\Delta\Delta L$ |
| Stain: TEA | | | | | | |
| 120 | — | 4 | 1 | −7.4 | −1.7 | 77 |
| 121 | Mowiol ™ 3-83 | 5 | 0 | −7.0 | −1.3 | 81 |
| 122 | Mowiol ™ 5-88 | 4 | 1 | −6.4 | −1.27 | 80 |
| 123 | Polyviol ™ V03/180 | 3 | 0 | −6.4 | −1.03 | 84 |
| 124 | Polyviol ™ W25/190 | 4 | 1 | −6.1 | −1.2 | 81 |
| C-6 | — | 0 | 0 | −6.3 | −3.4 | 46 |
| Stain: WINE | | | | | | |
| 125 | — | 4 | 1 | −12.5 | −1.2 | 90 |
| 126 | Mowiol ™ 3-83 | 5 | 0 | −12.4 | −0.9 | 93 |
| 127 | Mowiol ™ 5-88 | 4 | 1 | −12.6 | −1.1 | 91 |
| 128 | Polyviol ™ V03/180 | 3 | 0 | −13.9 | −0.7 | 95 |
| 129 | Polyviol ™ W25/190 | 4 | 1 | −11.4 | −0.8 | 93 |
| C-7 | — | 0 | 0 | −13.4 | −3.5 | 74 |

Note:
*lens opening of the Minolta colorimeter was set at 53 mm instead of 18 mm As can be seen from the above table, the addition of polyvinyl alcohol to the fluorochemical composition also slightly improves the stain release performance of the composition relative to aqueous based stains.

Examples 130 to 147

In Examples 130 to 147, PES/CO substrate was treated with fluorochemical compounds FC-17, FC-35 or FC-37 or with a 50/50 blend of the fluorochemical compound with Culminal™ MHPC 50 or Klucel™ M, as given in Table 11. The substrate was treated in such a way as to have 0.6% SOF fluorochemical compound or 0.6% SOF fluorochemical compound and 0.6% SOF Cellulose derivative. The treated substrates were stained with tea or DMO (brush) and tested for their stain release and repellency properties. The results are given in Table 11.

TABLE 11

| Ex No | Fluoro-chemical Compound | Cellulose Derivative | Initial Performance | | Stain Release Color Measurement | | % |
|---|---|---|---|---|---|---|---|
| | | | OR | WR | $\Delta L_{IN}$ | $\Delta L_{LD70°\,C.}$ | $\Delta\Delta L$ |
| Stain: TEA | | | | | | | |
| 130 | FC-17 | — | — | — | −2.5 | −1.1 | 55 |
| 131 | FC-17 | Culminal ™ | 6 | 8 | −2.3 | −1.0 | 57 |
| 132 | FC-17 | Klucel ™ | 6 | 8 | −2.7 | −0.9 | 66 |
| 133 | FC-35 | — | — | — | −2.9 | −1.3 | 56 |
| 134 | FC-35 | Culminal ™ | 5 | 2 | −2.7 | −0.9 | 69 |
| 135 | FC-35 | Klucel ™ | 5 | 0 | −3.2 | −0.9 | 72 |
| 136 | FC-37 | — | — | — | −2.4 | −0.7 | 71 |
| 137 | FC-37 | Culminal ™ | 2 | 0 | −2.5 | −0.9 | 63 |
| 138 | FC-37 | Klucel ™ | 6 | 0 | −3.1 | −0.8 | 74 |

TABLE 11-continued

| Ex No | Fluoro-chemical Compound | Cellulose Derivative | Initial Performance | | Stain Release Color Measurement | | % |
|---|---|---|---|---|---|---|---|
| | | | OR | WR | $\Delta L_{IN}$ | $\Delta L_{LD70°\,C.}$ | $\Delta\Delta L$ |
| Stain: DMO | | | | | | | |
| 139 | FC-17 | — | — | — | −16.8 | −8.7 | 48 |
| 140 | FC-17 | Culminal ™ | 6 | 8 | −16.2 | −5.1 | 69 |
| 141 | FC-17 | Klucel ™ | 6 | 8 | −16.3 | −3.0 | 81 |
| 142 | FC-35 | — | — | — | −17.0 | −6.1 | 64 |
| 143 | FC-35 | Culminal ™ | 5 | 2 | −17.3 | −4.3 | 75 |
| 144 | FC-35 | Klucel ™ | 5 | 0 | −17.7 | −5.2 | 71 |
| 145 | FC-37 | — | — | — | −17.9 | −4.6 | 74 |
| 146 | FC-37 | Culminal ™ | 2 | 0 | −16.7 | −4.9 | 71 |
| 147 | FC-37 | Klucel ™ | 6 | 0 | −16.8 | −1.1 | 93 |

The results for Examples 130 to 147 show that the stain release properties can also be improved by using a non-ionic cellulose ether in the fluorochemical composition.

Examples 148 to 167

In Examples 148 to 167, PES/CO substrate was treated with fluorochemical compounds FC-17, FC-35 or FC-37 or with a 50/50 blend of the fluorochemical compound with (meth)acrylic polymers as shown in Table 12. The substrate was treated in such a way as to have 0.6% SOF fluorochemical compound or 0.6% SOF fluorochemical compound and 0.6% SOF (meth)acrylic polymer. The treated substrates were stained with tea or DMO and tested for their stain release and repellency properties (brush method). The results are shown in Table 12.

TABLE 12

| Ex No | Fluoro-chemical Compound | (Meth)acrylic Polymer | Initial Performance | | Stain Release Color Measurement | | % |
|---|---|---|---|---|---|---|---|
| | | | OR | WR | $\Delta L_{IN}$ | $\Delta L_{LD70°\,C.}$ | $\Delta\Delta L$ |
| Stain: TEA | | | | | | | |
| 148 | FC-17 | — | — | — | −2.5 | −1.1 | 55 |
| 149 | FC-17 | MAP 1 | 5 | 4 | −2.2 | −1.3 | 43 |
| 150 | FC-17 | MAP 2 | 6 | 8 | −2.5 | −1.1 | 56 |
| 151 | FC-35 | — | — | — | −2.9 | −1.3 | 56 |
| 152 | FC-35 | MAP 1 | 5 | 0 | −2.6 | −0.8 | 70 |
| 153 | FC-35 | MAP 2 | 5 | 1 | −2.6 | −0.9 | 66 |
| 154 | FC-35 | MAP 3 | 5 | 3 | −2.4 | −0.9 | 62 |
| 155 | FC-37 | — | — | — | −2.4 | −0.7 | 71 |
| 156 | FC-37 | MAP 1 | 6 | 1 | −1.9 | −0.4 | 78 |
| 157 | FC-37 | MAP 2 | 6 | 1 | −2.4 | −0.8 | 66 |
| Stain: DMO | | | | | | | |
| 158 | FC-17 | — | — | — | −16.8 | −8.7 | 48 |
| 159 | FC-17 | MAP 1 | 5 | 4 | −16.5 | −4.3 | 74 |
| 160 | FC-17 | MAP 2 | 6 | 8 | −16.6 | −4.7 | 71 |
| 161 | FC-35 | — | — | — | −17.0 | −6.1 | 64 |
| 162 | FC-35 | MAP 1 | 5 | 0 | −17.2 | −5.3 | 69 |
| 163 | FC-35 | MAP 2 | 5 | 1 | −17.7 | −6.3 | 64 |
| 164 | FC-35 | MAP 3 | 5 | 3 | −17.7 | −5.2 | 70 |
| 165 | FC-37 | — | — | — | −17.9 | −4.6 | 74 |
| 166 | FC-37 | MAP 1 | 6 | 1 | −17.4 | −3.5 | 80 |
| 167 | FC-37 | MAP 2 | 6 | 1 | −17.1 | −4.8 | 72 |

Especially for DMO stains, stain release could be improved by adding a copolymer of an alkyl (meth)acrylate and (meth)acrylic acid to the fluorochemical composition.

Examples 168 to 197

In Examples 168 to 197, PES/CO substrate was treated with fluorochemical compounds FC-17, FC-35 or FC-37 or with a 50/50 blend of the fluorochemical compound with polyethyleneglycol of various molecular weight, as given in Table 13. The fluorochemical compound and the polyethyleneglycol (when used) were applied at 0.6% SOF each. The treated substrates were stained with DMO or tea and tested for their stain release properties (brush method). The results are shown in Table 13.

TABLE 13

| Ex No | FC | PEG | $\Delta L_{IN}$ | $\Delta L_{LD70°\,C.}$ | % $\Delta\Delta L$ |
|---|---|---|---|---|---|
| | | | Stain: DMO | | |
| 168 | FC-17 | — | −58.5 | −18.1 | 69 |
| 169 | FC-17 | PEG 200 | −58.2 | −16.5 | 72 |
| 170 | FC-17 | PEG 1000 | −56.9 | −12.5 | 78 |
| 171 | FC-17 | PEG 2000 | −53.5 | −8.1 | 85 |
| 172 | FC-17 | PEG 4000 | −57.3 | −16.8 | 71 |
| 173 | FC-35 | — | −54.0 | −18.3 | 66 |
| 174 | FC-35 | PEG 200 | −55.2 | −16.7 | 70 |
| 175 | FC-35 | PEG 1000 | −55.0 | −16.1 | 71 |
| 176 | FC-35 | PEG 2000 | −54.5 | −15.8 | 71 |
| 177 | FC-35 | PEG 4000 | −56.9 | −16.8 | 70 |
| 178 | FC-37 | — | −59.9 | −14.3 | 76 |
| 179 | FC-37 | PEG 200 | −56.9 | −11.3 | 80 |
| 180 | FC-37 | PEG 1000 | −58.4 | −13.0 | 78 |
| 181 | FC-37 | PEG 2000 | −58.6 | −11.5 | 80 |
| 182 | FC-37 | PEG 4000 | −56.6 | −10.5 | 81 |
| | | | Stain: TEA | | |
| 183 | FC-17 | — | −6.4 | −3.0 | 53 |
| 184 | FC-17 | PEG 200 | −7.5 | −4.0 | 47 |
| 185 | FC-17 | PEG 1000 | −7.0 | −3.2 | 54 |
| 186 | FC-17 | PEG 2000 | −6.4 | −2.9 | 55 |
| 187 | FC-17 | PEG 4000 | −7.0 | −3.8 | 46 |
| 188 | FC-35 | — | −6.4 | −2.3 | 64 |
| 189 | FC-35 | PEG 200 | −6.5 | −2.4 | 63 |
| 190 | FC-35 | PEG 1000 | −6.6 | −3.1 | 53 |
| 191 | FC-35 | PEG 2000 | −6.1 | −3.0 | 51 |
| 192 | FC-35 | PEG 4000 | −6.0 | −3.2 | 47 |
| 193 | FC-37 | — | −5.7 | −2.6 | 54 |
| 194 | FC-37 | PEG 200 | −4.6 | −2.8 | 58 |
| 195 | FC-37 | PEG 1000 | −6.9 | −2.8 | 59 |
| 196 | FC-37 | PEG 2000 | −6.7 | −2.1 | 69 |
| 197 | FC-37 | PEG 4000 | −6.7 | −2.4 | 64 |

Note:
*lens opening of the Minolta colorimeter was set at 53 mm

From the above Table, it can be concluded that the addition of polyethyleneglycol to the fluorochemical composition improves the stain release properties of the composition for DMO stains but little or no improvement is noticed relative to aqueous based stains. In certain cases, the addition of polyethyleneglycol appears to have a negative influence on the stain release properties in the case of aqueous based stains.

What is claimed is:

1. A method of treatment of a substrate comprising the step of contacting said substrate with a fluorochemical composition comprising a polymer derived from polymerization of monomer corresponding to the following general formula (I):

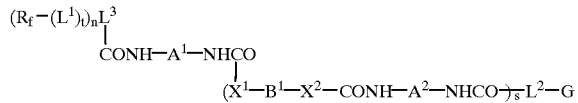

wherein:
$R_f$ is selected from the group consisting of perfluorinated or partially fluorinated aliphatic groups;

$L^1$ and $L^2$ each represent an organic divalent linking group and can be the same or different;

$L^3$ represents an organic linking group with a valence of n+1;

t is 0 or 1;

n is an integer of 2 to 20;

$A^1$ and $A^2$ each independently represent a divalent residue obtained by removing two —NCO groups from a corresponding diisocyanate, and can be the same or different;

$X^1$ and $X^2$ are each independently selected from the group consisting of O, NH and S;

$B^1$ represents a hydrophilic residue obtained by removing the groups $HX^1$ and $HX^2$ from a compound $HX^1$—$B^1$—$X^2H$ that comprises a poly(oxyalkylene) group;

G represents a free radical polymerizable group; and s is 0 or 1, with the proviso that when s is 0, $L^2$ represents a hydrophilic segment comprising a poly(oxyalkylene) group or said polymer is derived from a copolymerization of a monomer according to formula (I) and a poly(oxyalkylene) group containing monomer.

2. A method according to claim 1, wherein G is —(O)C—C(CH$_3$)=CH$_2$ or —(O)C—CH=CH$_2$.

3. A method according to claim 1, wherein $L^2$—G together is a moiety corresponding to the following formula (II):

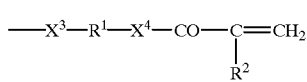

wherein:
$X^3$ and $X^4$ are each independently selected from O or NH, $R^1$ represents a linear or branched alkylene group having 2 to 4 carbon atoms or a group containing a poly(oxyalkylene) moiety, and $R^2$ is hydrogen or a methyl group.

4. A method according to claim 1, wherein $L^1$ is selected from the group consisting of:

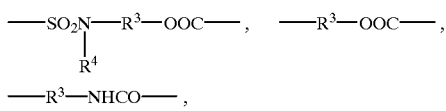

wherein:
$R^3$ represents a linear or branched alkylene group having 2 to 4 carbon atoms; and $R^4$ represents an alkyl group having 1 to 4 carbon atoms.

5. A method according to claim 1, wherein $L^3$ corresponds to the following formula:

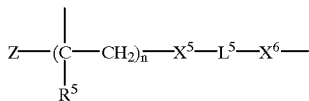

wherein:

n is an integer of 2 to 20;

Z represents the residue of a free radical initiator;

$R^5$ is hydrogen or a methyl group;

$X^5$ is S;

$X^6$ is O or NH; and $L^5$ represents an alkylene group having 2 to 4 carbon atoms.

6. A method according to claim 1, wherein said poly(oxyalkylene) group containing monomer copolymerized with the monomer of formula (I) corresponds to the following formula:

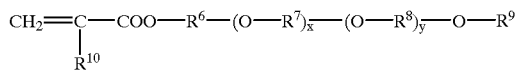

wherein:

$R^6$, $R^7$ and $R^8$ are each independently selected from the group consisting of linear or branched alkylene groups having 2 to 4 carbon atoms;

$R^9$ is hydrogen or an alkyl group having 1 to 4 carbon atoms;

x and y are each independently selected from integers of 0 to 30, provided the sum of x and y is at least 5; and $R^{10}$ is hydrogen or a methyl group.

7. A method according to claim 1, wherein said substrate is a fibrous substrate.

8. A method according to claim 7, wherein said substrate comprises natural fibers.

9. A method according to claim 7, wherein said fibers are selected from the group consisting of cellulose fibers, polyester fibers, and blends thereof.

10. A method according to claim 7, wherein said substrate is textile or paper.

11. A method according to claim 1, wherein the fluorochemical composition further comprises a polymer selected from the group consisting of polyvinyl alcohols, non-ionic cellulose ethers, polyethylene glycols and copolymers of an alkyl(meth)acrylate and (meth)acrylic acid.

12. The method of claim 1 wherein s is 0 and $L^2$ represents a hydrophilic segment comprising a poly(oxyalkylene) group.

13. The method of claim 1 wherein the number of oxyalkylene moieties in said poly(oxyalkylene) group is between 18 and 275.

14. The method of claim 1 wherein s is 1.

15. A fluorochemical composition comprising a polymer derived from a polymerization of a monomer corresponding to the following general formula (I):

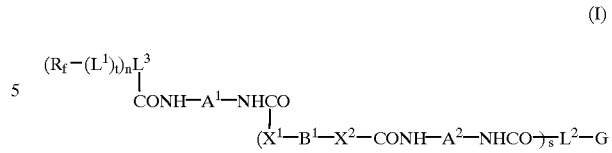

wherein:

$R_f$ is selected from the group consisting of perfluorinated or partially fluorinated aliphatic groups;

$L^1$ and $L^2$ each independently represent an organic divalent linking group and may be the same or different;

$L^3$ represents an organic linking group having a valence of n+1;

t is 0 or 1;

n is an integer of 2 to 20;

$A^1$ and $A^2$ each independently represent a divalent residue obtained by removing two —NCO groups from a corresponding diisocyanate and may be the same or different;

$X^1$ and $X^2$ are each independently selected from the group consisting of O, NH or S;

$B^1$ represents a hydrophilic residue obtained by removing the groups $HX^1$ and $HX^2$ from a compound $HX^1$—$B^1$—$X^2H$ that comprises a poly(oxyalkylene) group;

G represents a free radical polymerizable group; and s is 0 or 1, with the proviso that when s is 0, $L^2$ represents a hydrophilic segment comprising a poly(oxyalkylene) group or said polymer is derived from a copolymerization of a monomer according to formula (I) and a poly(oxyalkylene) group containing monomer.

16. A fluorochemical composition according to claim 15, wherein G is —(O)C—C(CH$_3$)=CH$_2$or —(O)C—CH=CH$_2$.

17. A fluorochemical composition according to claim 15, wherein $L^2$—G together is a moiety corresponding to the following formula (II):

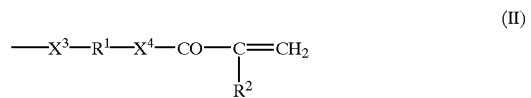

wherein:

$X^3$ and $X^4$ are each independently selected from O or NH;

$R^1$ represents a linear or branched alkylene group having 1 to 4 carbon atoms or a group containing poly(oxyalkylene) moiety; and $R^2$ is hydrogen or a methyl group.

18. A fluorochemical composition according to claim 15, wherein $L^1$ corresponds to one the following formulas:

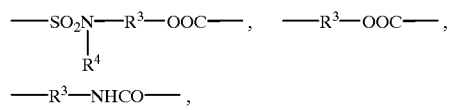

wherein $R^3$ represents a linear or branched alkylene group having 2 to 4 carbon atoms; and $R^4$ represents an alkyl group having 1 to 4 carbon atoms.

19. A fluorochemical composition according to claim 15, wherein $L^3$ corresponds to the following formula:

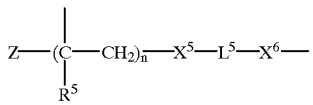

wherein:
n is an integer of 2 to 20;
Z represents the residue of a free radical initiator;
$R^5$ is hydrogen or a methyl group;
$X^6$ is O or NH; and
$L^5$ is an alkylene group having 2 to 4 carbon atoms.

20. A fluorochemical composition according to claim 15, wherein said poly(oxyalkylene) group containing monomer copolymerized with the monomer of formula (I) corresponds to the following formula:

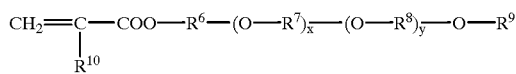

wherein:
$R^6$, $R^7$ and $R^8$ are each independently selected from the group consisting of linear or branched alkylene groups having 2 to 4 carbon atoms;
$R^9$ is hydrogen or an alkyl group having 1 to 4 carbon atoms;
x and y are each independently selected from integers of 0 to 30, provided the sum of x and y is at least 5; and
$R^{10}$ is hydrogen or a methyl group.

21. A fluorochemical composition according to claim 15, wherein the fluorochemical composition further comprises a polymer selected from the group consisting of polyvinyl alcohols, non-ionic cellulose ethers, polyethylene glycols and copolymers of an alkyl(meth)acrylate and (meth)acrylic acid.

22. A monomer corresponding to the following formula (1):

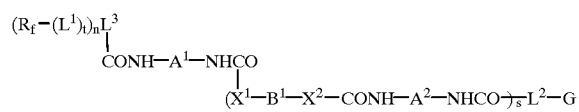

wherein:
$R_f$ is selected from the group consisting of partially or perfluorinated aliphatic groups;
$L^1$ and $L^2$ each independently represent an organic divalent linking group and can be the same or different;
$L^3$ represents an organic linking group with a valence of n+1;
t is 0 or 1;
n is an integer of 2 to 20;
$A^1$ and $A^2$ each independently represent a divalent residue obtained by removing two —NCO groups from a corresponding diisocyanate and can be the same or different;
$X^1$ and $X^2$ are each independently selected from the group consisting of O, NH or S;
$B^1$ represents a hydrophilic residue obtained by removing the groups $HX^1$ and $HX^2$ from a compound $HX^1$—$B^1$—$X^2H$ that comprises a poly(oxyalkylene) group;
G represents a free radical polymerizable group; and
s is 0 or 1.

23. A monomer composition comprising a monomer containing a 25 poly(oxyalkylene) group and a monomer according to claim 22 wherein s is 0.

24. A monomer composition according to claim 23, wherein said poly(oxyalkylene) group containing monomer corresponds to the following formula:

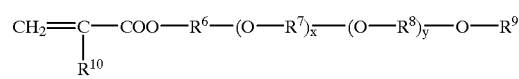

wherein:
$R^6$, $R^7$ and $R^8$ are each independently selected from the group consisting of linear or branched alkylene groups having 2 to 6 carbon atoms;
$R^9$ is hydrogen or an alkyl group having 1 to 4 carbon atoms;
x and y are each independently selected from integers of 0 to 30, provided the sum of x and y is at least 5; and
$R^{10}$ is hydrogen or a methyl group.

25. A method of treatment of a substrate comprising the step of contacting said substrate with a fluorochemical composition comprising a polymer derived from polymerization of monomer corresponding to the following general formula (I):

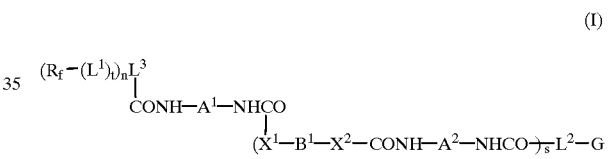

wherein:
$R_f$ is selected from the group consisting of perfluorinated or partially fluorinated aliphatic groups;
$L^1$ and $L^2$ each represent an organic divalent linking group and can be the same or different;
$L^3$ represents an organic linking group with a valence of n+1;
t is 0 or 1;
n is an integer of 2 to 20;
$A^1$ and $A^2$ each independently represent a divalent residue obtained by removing two —NCO groups from a corresponding diisocyanate, and can be the same or different;
$X^1$ and $X^2$ are each independently selected from the group consisting of O, NH and S;
$B^1$ represents a hydrophilic residue obtained by removing the groups $HX^1$ and $HX^2$ from a compound $HX^1$—$B^1$—$X^2H$ that comprises a poly(oxyalkylene) group;
G represents a free radical polymerizable group; and
s is 0 or 1, with the proviso that when s is 0, $L^2$ represents a hydrophilic segment comprising a poly(oxyalkylene) group.

* * * * *

UNITED STATES PATENT AND TRADEMARK OFFICE
CERTIFICATE OF CORRECTION

PATENT NO. : 6,383,633 B1
DATED : May 7, 2002
INVENTOR(S) : Allewaert, Kathy E. M. L. A It is certified that error appears in the above-identified patent and that said Letters Patent is hereby corrected as shown below:

Column 4,
Line 7, delete "disocyanate" and insert in place thereof -- diisocyanate --.
Line 37, following "thereof" insert -- . --.

Column 5,
Line 28, delete "$X^6$is" and insert in place thereof -- $X^6$ is --.

Column 8,
Line 64, following "thereof" insert -- . --.

Column 12,
Line 42, delete "–M:" and insert in place thereof -- –MA: --.

Column 13,
Line 31, delete "metbacrylic" and insert in place thereof -- methacrylic --.

Column 14,
Line 46, delete "–IPD/HFO–1" and insert in place thereof -- –IPDI/HFO-1 --.

Column 15,
Line 35, delete "IDI" and insert in place thereof -- TDI --.

Column 19,
Line 1, delete "untrated" and insert in place thereof -- untreated --.

Column 20,
Line 28, delete "ds" and insert in place thereof -- compounds --.

Column 25,
Line 47, following "said" insert -- substrate is fibrous and the --.

Column 26,
Line 36, delete "=$CH_2$or" and insert in place thereof -- =$CH_2$ or --.

Column 27,
Line 4, delete "–$X^5$–$L^5$" and insert in place thereof -- –S–$L^5$ --.
Line 39, delete "(1):" and insert in place thereof -- (I): --.

UNITED STATES PATENT AND TRADEMARK OFFICE
CERTIFICATE OF CORRECTION

PATENT NO. : 6,383,633 B1
DATED : May 7, 2002
INVENTOR(S) : Allewaert, Kathy E. M. L. A Page 2 of 2

It is certified that error appears in the above-identified patent and that said Letters Patent is hereby corrected as shown below:

<u>Column 28,</u>
Line 5, delete "25" following "a".

Signed and Sealed this

Twenty-eighth Day of December, 2004

JON W. DUDAS
*Director of the United States Patent and Trademark Office*